US010992872B2

(12) United States Patent
Hasegawa et al.

(10) Patent No.: US 10,992,872 B2
(45) Date of Patent: Apr. 27, 2021

(54) IMAGING CONTROL DEVICE, IMAGING APPARATUS, IMAGING CONTROL METHOD, AND STORAGE MEDIUM

(71) Applicant: FUJIFILM Corporation, Tokyo (JP)

(72) Inventors: Ryo Hasegawa, Saitama (JP); Makoto Kobayashi, Saitama (JP); Hitoshi Sakurabu, Saitama (JP); Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/020,792

(22) Filed: Sep. 14, 2020

(65) Prior Publication Data

US 2020/0412931 A1 Dec. 31, 2020

Related U.S. Application Data

(63) Continuation of application No. PCT/JP2019/005392, filed on Feb. 14, 2019.

(30) Foreign Application Priority Data

Mar. 23, 2018 (JP) .............................. JP2018-057246

(51) Int. Cl.
*H04N 5/235* (2006.01)
*H04N 5/232* (2006.01)
*H04N 5/365* (2011.01)

(52) U.S. Cl.
CPC ....... *H04N 5/2351* (2013.01); *H04N 5/23212* (2013.01); *H04N 5/3656* (2013.01)

(58) Field of Classification Search
CPC .................................................... H04N 5/2351
(Continued)

(56) References Cited

U.S. PATENT DOCUMENTS

2017/0163918 A1\* 6/2017 Chen .................... H04N 5/2254

FOREIGN PATENT DOCUMENTS

JP 2003116064 4/2003
JP 2004207895 7/2004
(Continued)

OTHER PUBLICATIONS

"International Search Report (Form PCT/ISA/210) of PCT/JP2019/005392," dated Apr. 23, 2019, with English translation thereof, pp. 1-4.
(Continued)

*Primary Examiner* — Joel W Fosselman
(74) *Attorney, Agent, or Firm* — JCIPRNET

(57) ABSTRACT

An imaging control device includes: a controller that causes an imager to perform first imaging and further perform second imaging a plurality of times; and a dark image signal acquirer, the controller causes the imager to perform the second imaging in each of a plurality of exposure states where a quantity of light incident on the imager is greater than 0 and is different for each of the exposure states, by controlling the optical element, and the controller obtains, by controlling the movable lens at a time of the second imaging, a state where a first imaging condition value determined by a control state of the movable lens at the time of the second imaging is different from a second imaging condition value determined by a control state of the movable lens at a time of the first imaging.

17 Claims, 8 Drawing Sheets

(58) Field of Classification Search
USPC ..................................................... 348/222.1
See application file for complete search history.

(56) References Cited

FOREIGN PATENT DOCUMENTS

| | | |
|---|---|---|
| JP | 2006345458 | 12/2006 |
| JP | 2007336386 | 12/2007 |
| JP | 2012175408 | 9/2012 |

OTHER PUBLICATIONS

"Written Opinion of the International Searching Authority (Form PCT/ISA/237) of PCT/JP2019/005392," dated Apr. 23, 2019, with English translation thereof, pp. 1-7.

* cited by examiner

IMAGING CONTROL DEVICE, IMAGING APPARATUS, IMAGING CONTROL METHOD, AND STORAGE MEDIUM

CROSS REFERENCE TO RELATED APPLICATION

This is a continuation of International Application No. PCT/JP2019/005392 filed on Feb. 14, 2019, and claims priority from Japanese Patent Application No. 2018-057246 filed on Mar. 23, 2018, the entire disclosures of which are incorporated herein by reference.

BACKGROUND OF THE INVENTION

1. Field of the Invention

The present invention relates to an imaging control device, an imaging apparatus, an imaging control method, and a non-transitory computer readable medium storing an imaging control program.

2. Description of the Related Art

In the case of imaging a subject by an imager, a dark image signal obtained from an imager in a light-blocking state where subject light is not incident on the imager is obtained, and the dark image signal is subtracted from a captured image signal obtained from the imager in a state where the subject light is incident on the imager.

JP2004-207895A discloses obtaining a dark image signal by controlling a light reduction filter arranged ahead of an imager to a non-transmission state.

JP2012-175408A discloses performing imaging twice with different quantities of light incident on an imager by controlling a stop arranged ahead of the imager, and obtaining a dark image signal by comparing captured image signals obtained by imaging performed twice.

SUMMARY OF THE INVENTION

In the method disclosed in JP2004-207895A, it is difficult to set a lower limit value of transmittance of the light reduction filter to 0. Thus, the dark image signal cannot be accurately obtained.

In the method disclosed in JP2012-175408A, in a case where a subject is in motion or an imaging apparatus is in motion during imaging performed a plurality of times by changing the stop, deviation occurs in a relationship between a ratio of the stop and the difference between the captured image signals obtained by imaging performed a plurality of times. Thus, the dark image signal cannot be accurately canceled.

The present invention is conceived in view of the above matter, and an object thereof is to provide an imaging control device, an imaging apparatus, an imaging control method, and an imaging control program capable of accurately obtaining a dark image signal.

An imaging control device of the present invention comprises a controller that causes an imager which images a subject through a movable lens and an optical element of which a quantity of transmitted light is variable, to perform first imaging for recording and further perform second imaging a plurality of times for obtaining a dark image signal generated in a light-blocking state of the imager, and a dark image signal acquirer that obtains the dark image signal based on a plurality of first captured image signals obtained from the imager by the second imaging performed a plurality of times, in which the controller causes the imager to perform the second imaging in each of a plurality of exposure states where a quantity of light incident on the imager is greater than zero and is different for each state, by controlling the optical element, and the controller obtains, by controlling the movable lens at a time of the second imaging, a state where a first imaging condition value determined by a control state of the movable lens at the time of the second imaging is different from a second imaging condition value determined by a control state of the movable lens at a time of the first imaging.

An imaging apparatus of the present invention comprises the imaging control device and the imager.

An imaging control method of the present invention comprises a control step of causing an imager which images a subject through a movable lens and an optical element of which a quantity of transmitted light is variable, to perform first imaging for recording and further perform second imaging a plurality of times for obtaining a dark image signal generated in a light-blocking state of the imager, and a dark image signal acquisition step of obtaining the dark image signal based on a plurality of first captured image signals obtained from the imager by the second imaging performed a plurality of times, in which in the control step, the imager is caused to perform the second imaging in each of a plurality of exposure states where a quantity of light incident on the imager is greater than zero and is different for each state, by controlling the optical element, and in the control step, by controlling the movable lens at a time of the second imaging, a state where a first imaging condition value determined by a control state of the movable lens at the time of the second imaging is different from a second imaging condition value determined by a control state of the movable lens at a time of the first imaging is obtained.

An imaging control program of the present invention is a program causing a computer to execute a control step of causing an imager which images a subject through a movable lens and an optical element of which a quantity of transmitted light is variable, to perform first imaging for recording and further perform second imaging a plurality of times for obtaining a dark image signal generated in a light-blocking state of the imager, and a dark image signal acquisition step of obtaining the dark image signal based on a plurality of first captured image signals obtained from the imager by the second imaging performed a plurality of times, in which in the control step, the imager is caused to perform the second imaging in each of a plurality of exposure states where a quantity of light incident on the imager is greater than zero and is different for each state, by controlling the optical element, and in the control step, by controlling the movable lens at a time of the second imaging, a state where a first imaging condition value determined by a control state of the movable lens at the time of the second imaging is different from a second imaging condition value determined by a control state of the movable lens at a time of the first imaging is obtained.

According to the present invention, an imaging control device, an imaging apparatus, an imaging control method, and an imaging control program capable of accurately obtaining a dark image signal can be provided.

DESCRIPTION OF THE PREFERRED EMBODIMENTS

Hereinafter, an embodiment of the present invention will be described with reference to the drawings.

Figure 1:
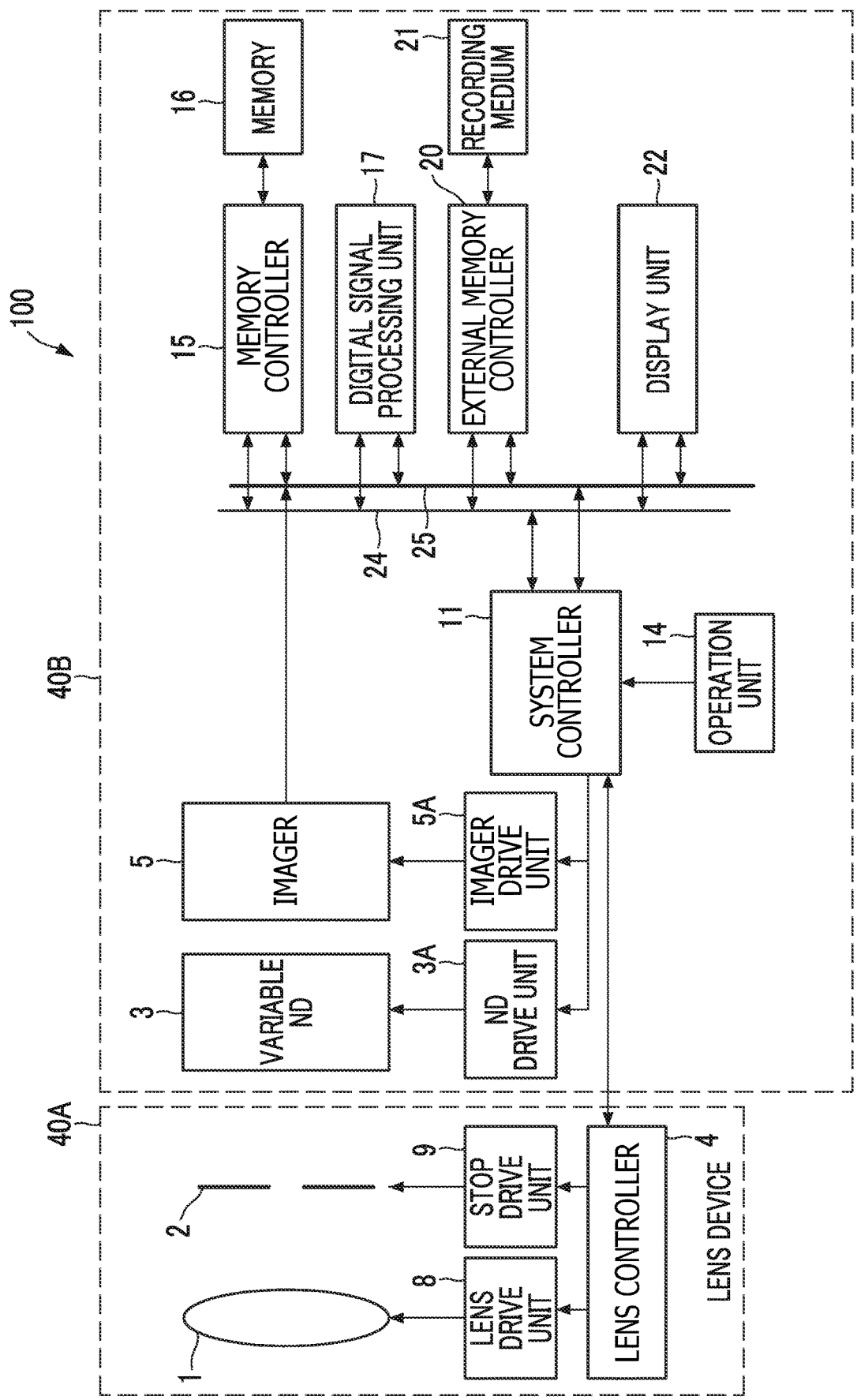
FIG. 1 is a diagram illustrating a schematic configuration of a digital camera 100 that is an imaging apparatus according to one embodiment of the present invention.

FIG. 1 is a diagram illustrating a schematic configuration of a digital camera 100 that is an imaging apparatus according to one embodiment of the present invention.

The digital camera 100 illustrated in FIG. 1 comprises a lens device 40A that includes an imaging lens 1, a stop 2, a lens controller 4, a lens drive unit 8, and a stop drive unit 9; and a main body unit 40B.

The lens device 40A may be attachable and detachable with respect to the main body unit 40B or may be integrated with the main body unit 40B. In a configuration in which the lens device 40A is attachable and detachable with respect to the main body unit 40B, the main body unit 40B constitutes the imaging apparatus.

The imaging lens 1 includes a focus lens and a zoom lens that can be moved in an optical axis direction. Each of the focus lens and the zoom lens constitutes a movable lens.

The focus lens is a lens for adjusting a focal position of the imaging lens 1 and is composed of a single lens or a plurality of lenses. The focal position is adjusted by moving the focus lens in the optical axis direction of the imaging lens 1.

A liquid lens that can change the focal position by variably controlling a curved surface of the lens may be used as the focus lens.

The zoom lens is a lens for adjusting a focal length of the imaging lens 1 and is composed of a single lens or a plurality of lenses. The focal length is changed by moving the zoom lens in the optical axis direction of the imaging lens 1.

The lens controller 4 of the lens device 40A is configured to be capable of communicating with a system controller 11 of the main body unit 40B in a wired or wireless manner.

In accordance with an instruction from the system controller 11, the lens controller 4 changes the position (focal position) of a principal point of the focus lens by controlling the focus lens included in the imaging lens 1 through the lens drive unit 8, changes the position (focal length) of the zoom lens by controlling the zoom lens included in the imaging lens 1 through the lens drive unit 8, or controls an F number of the stop 2 through the stop drive unit 9.

The main body unit 40B comprises an imager 5 such as a charged coupled device (CCD) type image sensor or a metal oxide semiconductor (MOS) type image sensor that images a subject through an imaging optical system including the imaging lens 1 and the stop 2, an imager drive unit 5A that drives the imager 5, a neutral density (ND) filter 3 that is arranged between the imager 5 and the imaging optical system, an ND drive unit 3A that drives the variable ND filter 3, the system controller 11 that manages and controls the entire main body unit 40B, and an operation unit 14.

The imager 5 includes an imaging surface on which a plurality of pixels are two-dimensionally arranged, converts a subject image formed on the imaging surface by the imaging optical system into pixel signals by the plurality of pixels, and outputs the pixel signals. Hereinafter, a set of pixel signals output from the pixels of the imager 5 will be referred to as a captured image signal.

The imager drive unit 5A drives the imager 5 by generating a drive signal based on an instruction from the system controller 11 and supplying the drive signal to the imager 5.

The variable ND filter 3 is an optical element of which the quantity of transmitted light is variable, and for example, has a configuration in which physical property elements (for example, liquid crystal elements or electrochromic elements) that can change the transmittance of light by an applied voltage are two-dimensionally arranged.

The variable ND filter 3 may be integrally formed with the imager 5. For example, the imager 5 comprises an imager chip, a package that accommodates the imager chip, and a protective cover that seals the package. The variable ND filter 3 may be laminated on the protective cover.

The ND drive unit 3A controls the transmittance of the variable ND filter 3 by controlling a voltage applied to each physical property element of the variable ND filter 3 in accordance with an instruction from the system controller 11.

The system controller 11 manages and controls the entire digital camera 100. A hardware structure of the system controller 11 corresponds to various processors that perform processing by executing programs including an imaging control program.

The various processors include a central processing unit (CPU) that is a general-purpose processor performing various types of processing by executing a program, a programmable logic device (PLD) that is a processor of which a circuit configuration can be changed after manufacturing like a field programmable gate array (FPGA), or a dedicated electric circuit that is a processor having a circuit configuration dedicatedly designed to execute a specific type of processing like an application specific integrated circuit (ASIC).

More specifically, a structure of the various processors is an electric circuit in which circuit elements such as semiconductor elements are combined.

The system controller 11 may be configured with one of the various processors or may be configured with a combination of two or more processors of the same type or different types (for example, a combination of a plurality of FPGAs or a combination of a CPU and an FPGA).

The main body unit 40B further comprises a memory 16 including a random access memory (RAM) and a read only memory (ROM), a memory controller 15 that controls data storage in the memory 16 and data read from the memory 16, a digital signal processing unit 17 that generates captured image data in accordance with various formats such as Joint Photographic Experts Group (JPEG) format by performing digital signal processing on the captured image signal output from the imager 5, an external memory controller 20 that controls data storage in a storage medium 21 and data read from the storage medium 21, and a display unit 22 including an organic electroluminescence (EL) panel, a liquid crystal panel, or the like for displaying images.

The ROM included in the memory 16 stores programs executed by the system controller 11 including the imaging control program.

The memory controller 15, the digital signal processing unit 17, the external memory controller 20, and the display unit 22 are connected to each other through a control bus 24 and a data bus 25 and are controlled by instructions from the system controller 11.

A hardware structure of the digital signal processing unit 17 corresponds to the above illustrated various processors that perform processing by executing programs including the imaging control program.

Figure 2:
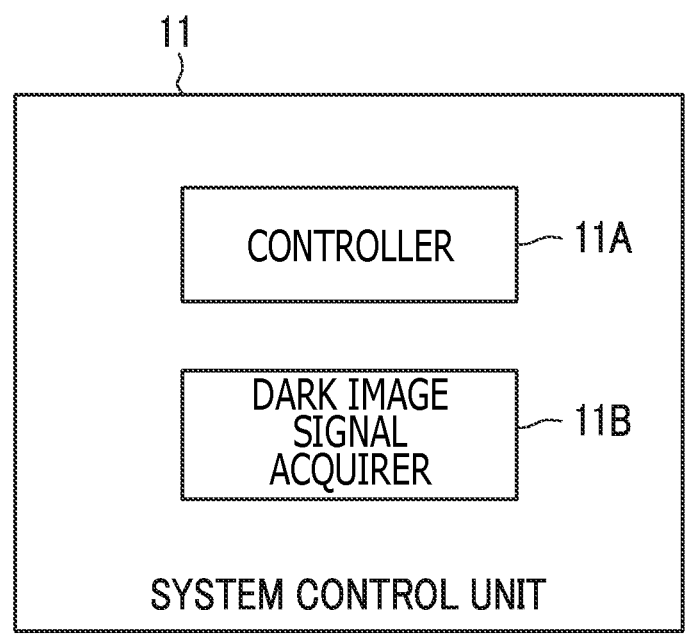
FIG. 2 is a function block diagram of a system controller 11 illustrated in FIG. 1.

FIG. 2 is a function block diagram of the system controller 11 illustrated in FIG. 1.

The system controller 11 functions as a controller 11A and a dark image signal acquirer 11B by executing the programs stored in the ROM of the memory 16 including the imaging control program.

The controller 11A causes the imager 5 to perform first imaging for recording and furthermore, controls the variable ND filter 3 and causes the imager 5 to perform second imaging for obtaining a dark image signal generated in a light-blocking state of the imager 5 in each of a plurality of exposure states where the quantity of light incident on the imager 5 is greater than 0 and is different for each state.

Furthermore, at the time of the second imaging, the controller 11A obtains, by controlling the focus lens, a state where a focal position that is a first imaging condition value determined by a control state of the focus lens at the time of the second imaging is different from a focal position that is a second imaging condition value determined by the control state of the focus lens at the time of the first imaging.

The dark image signal acquirer 11B obtains the dark image signal based on a plurality of captured image signals obtained from the imager 5 by the second imaging performed a plurality of times.

Figure 3:
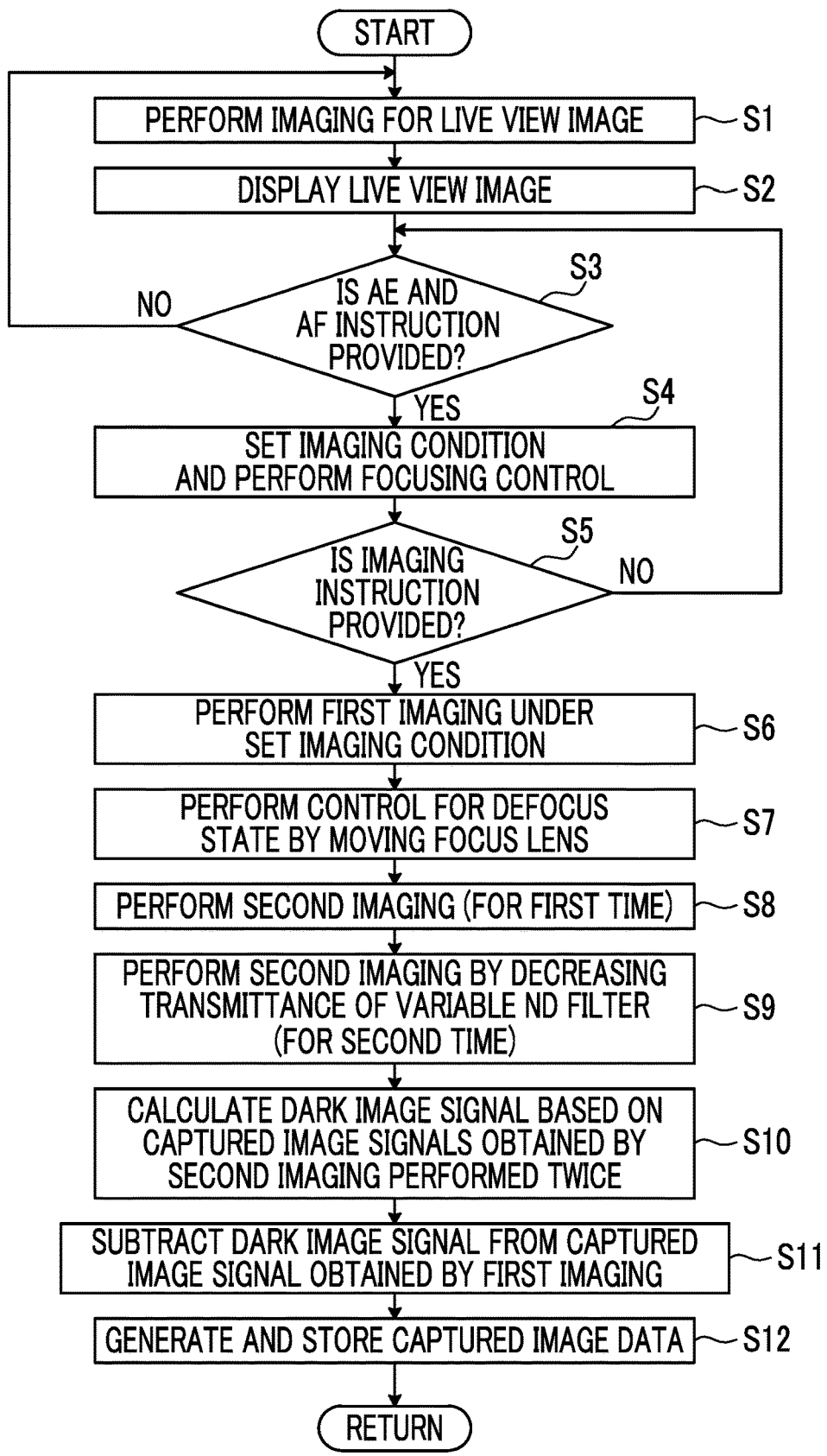
FIG. 3 is a flowchart for describing an operation at a time of an imaging mode of the digital camera 100 illustrated in FIG. 1.

FIG. 3 is a flowchart for describing an operation at the time of an imaging mode of the digital camera 100 illustrated in FIG. 1.

In an initial state where the imaging mode is set, the system controller 11 controls the transmittance of all physical property elements of the variable ND filter 3 to 100%.

In a case where the imaging mode is set, the system controller 11 causes the imager 5 to perform imaging for displaying a live view image (step S1).

Image data for live view display is generated by causing the digital signal processing unit 17 to process the captured image signal output from the imager 5 by imaging, and the live view image is displayed on the display unit 22 based on the image data (step S2).

After step S2, processing of step S1 and step S2 is repeated until an auto exposure (AE) and auto focus (AF) execution instruction is provided by performing pushing or the like on a release button included in the operation unit 14 in step S3.

In a case where the AE and AF execution instruction is provided in step S3 (step S3: YES), the system controller 11 causes the imager 5 to perform imaging for light measurement and AF. In a case where the captured image signal is output from the imager 5 by imaging, the system controller 11 obtains the brightness of the subject based on the captured image signal and determines appropriate exposure based on the brightness. Furthermore, the system controller 11 calculates a defocus amount based on the captured image signal.

Then, the system controller 11 sets an imaging condition consisting of an exposure time period of the imager 5, an F number of the stop 2, imaging sensitivity, and the transmittance of the variable ND filter 3 for achieving the determined appropriate exposure and performs focusing control for setting the focal position to a target position by controlling the focus lens based on the calculated defocus amount (step S4). The transmittance of the variable ND filter 3 set here is a value with which the quantity of subject light incident on the imager 5 exceeds "0".

After step S4, the system controller 11 waits until an imaging instruction for recording is provided by performing pushing or the like on a release button included in the operation unit 14. In a case where the imaging instruction is not provided (step S5: NO), the system controller 11 returns processing to step S3.

In a case where the imaging instruction is provided (step S5: YES), the controller 11A of the system controller 11 causes the imager 5 to perform the first imaging for recording in a focusing state under the imaging condition set in step S4 (step S6).

After step S6, the controller 11A of the system controller 11 changes the focal position by controlling the focus lens and obtains a state where the focal position after change is different from the focal position at the time of the first imaging in step S6, specifically, a state where a difference between the focal position after change and the focal position at the time of the first imaging in step S6 is greater than or equal to a predetermined value (step S7). A defocus state is obtained by processing of step S7.

The predetermined value may be a value with which a state where a captured image is large and blurred compared to the time of the first imaging is set. For example, this value is set to half of a movable range (maximum movable range of the focal position of the imaging lens 1) of the focus lens.

In the defocus state, the controller 11A of the system controller 11 causes the imager 5 to perform the second imaging for the first time for obtaining the dark image signal (step S8). This second imaging is performed under the same imaging condition as the first imaging except for the focal position.

Next, the controller 11A of the system controller 11 controls the transmittance of the variable ND filter 3 to a value (for example, a half value of the second imaging performed for the first time) less than the transmittance at the time of the second imaging performed for the first time in step S8. In this state, the controller 11A causes the imager 5 to perform the second imaging for the second time for obtaining the dark image signal (step S9). Step S6 to step S9 constitute a control step.

Next, the dark image signal acquirer 11B acquires the captured image signal output from the imager 5 by the second imaging in step S8 and the captured image signal output from the imager 5 by the second imaging in step S9, and calculates the dark image signal based on the two captured image signals (step S10). Step S10 constitutes a dark image signal acquisition step.

For example, a component corresponding to the subject light in the captured image signal output from the imager 5 by the second imaging in step S8 is denoted by Pa. A component corresponding to the subject light in the captured image signal output from the imager 5 by the second imaging in step S9 is denoted by Pb. The dark image signal is denoted by Pob.

By doing so, a captured image signal Sa of "Pa+Pob" is obtained by the second imaging in step S8, and a captured image signal Sb of "(Pa/2)+Pob" is obtained by the second imaging in step S9.

In a case where the captured image signal Sb is subtracted from the captured image signal Sa, "Pa/2" is obtained. Accordingly, the dark image signal Pob can be calculated by subtracting "Pa/2" from the captured image signal Sb. A method of calculating the dark image signal is not limited thereto. For example, the dark image signal may be calculated using the method disclosed in JP2012-175408A.

After step S10, the system controller 11 performs black level correction processing of subtracting the dark image signal calculated in step S10 from the captured image signal output from the imager 5 by the first imaging in step S6 (step S11).

Then, the captured image data is generated by causing the digital signal processing unit 17 to process the captured image signal after the black level correction processing and is stored in the storage medium 21 (step S12).

As described above, the digital camera 100 performs the second imaging, which is performed a plurality of times for obtaining the dark image signal, in the defocus state. Thus, even in a case where the subject is moving or the digital camera 100 is moving during the second imaging performed a plurality of times, a difference is unlikely to occur between the captured image signals obtained by the second imaging performed a plurality of times. Accordingly, the dark image signal can be accurately obtained.

Figure 4:
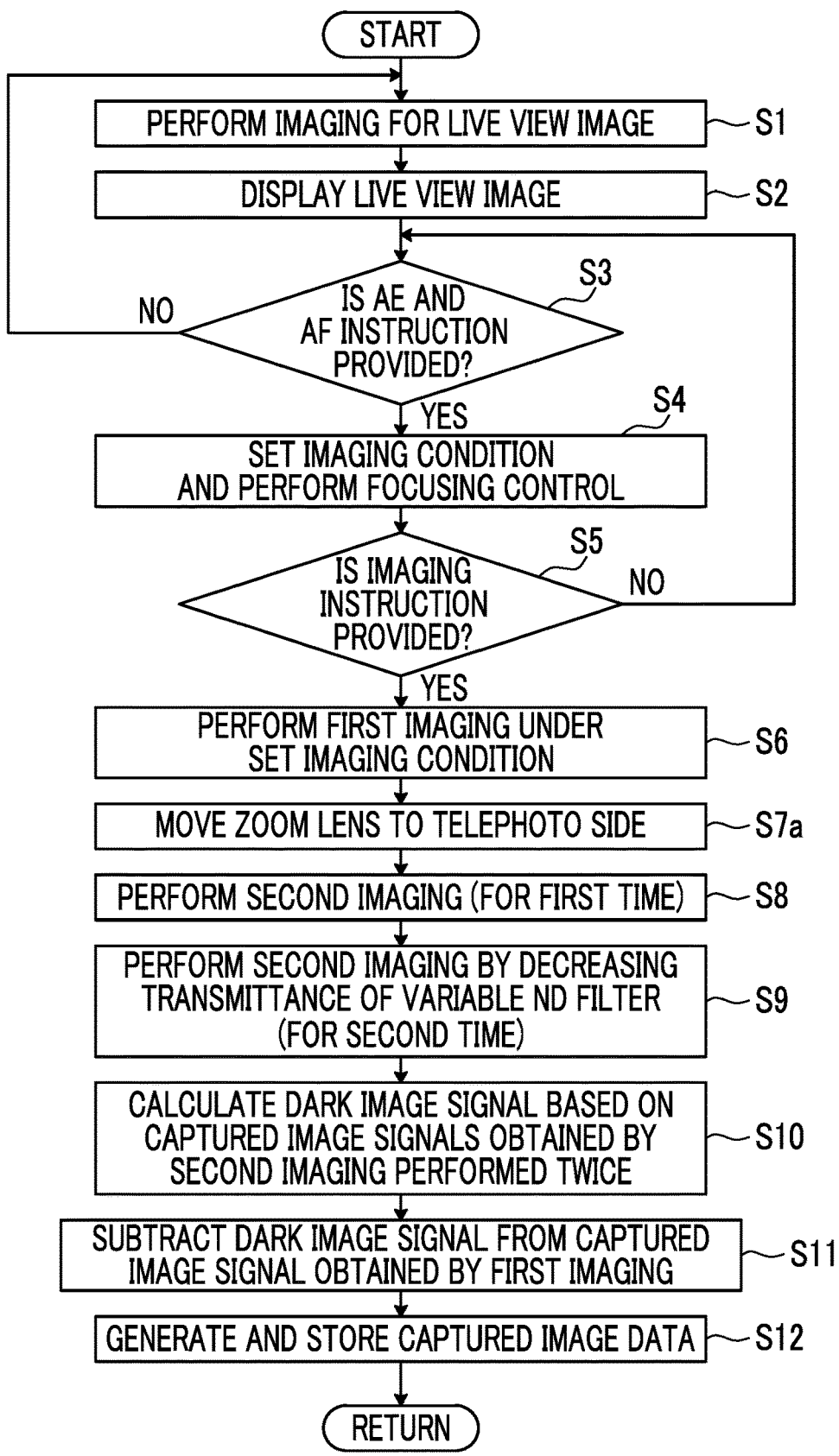
FIG. 4 is a flowchart for describing a first modification example of the operation at the time of the imaging mode of the digital camera 100 illustrated in FIG. 1.

FIG. 4 is a flowchart for describing a first modification example of the operation at the time of the imaging mode of the digital camera 100 illustrated in FIG. 1.

The flowchart illustrated in FIG. 4 is the same as FIG. 3 except for a point that step S7 is changed to step S7a. In FIG. 4, the same processing as FIG. 3 is designated by the same reference signs, and descriptions of such processing will not be repeated. In FIG. 4, a case where the position of the zoom lens included in the imaging lens 1 is sufficiently on a wide angle end side from a telephoto end at the time of the first imaging in step S6 is assumed.

After step S6, the controller 11A of the system controller 11 changes the focal length by controlling the zoom lens and obtains a state where the focal length (first imaging condition value) after change is different from the focal length (second imaging condition value) set at the time of the first imaging in step S6 (step S7a). For example, the focal length after change has the maximum settable value of the focal length.

After step S7a, processing from S8 is performed.

According to the above first modification example, the second imaging performed a plurality of times for obtaining the dark image signal is performed in a state where the focal length is longest. By changing from the first imaging in the focusing state to a telephoto state, the captured image is likely to be blurred at the time of the second imaging. Thus, even in a case where the subject is moving or the digital camera 100 is moving during the second imaging performed a plurality of times, a difference is unlikely to occur between the captured image signals obtained by the second imaging performed a plurality of times. Accordingly, the dark image signal can be accurately obtained.

In step S6 in FIG. 4, a determination as to whether or not the focal length is greater than or equal to a predetermined value (the maximum value or a value close thereto) may be performed. In a case where it is determined that the focal length is greater than or equal to the value, processing of step S7 in FIG. 3 may be performed instead of processing of step S7a. In a case where it is determined that the focal length is less than the value, processing of step S7a may be performed. By doing so, the dark image signal can be accurately obtained regardless of a zoom state.

Figure 5:
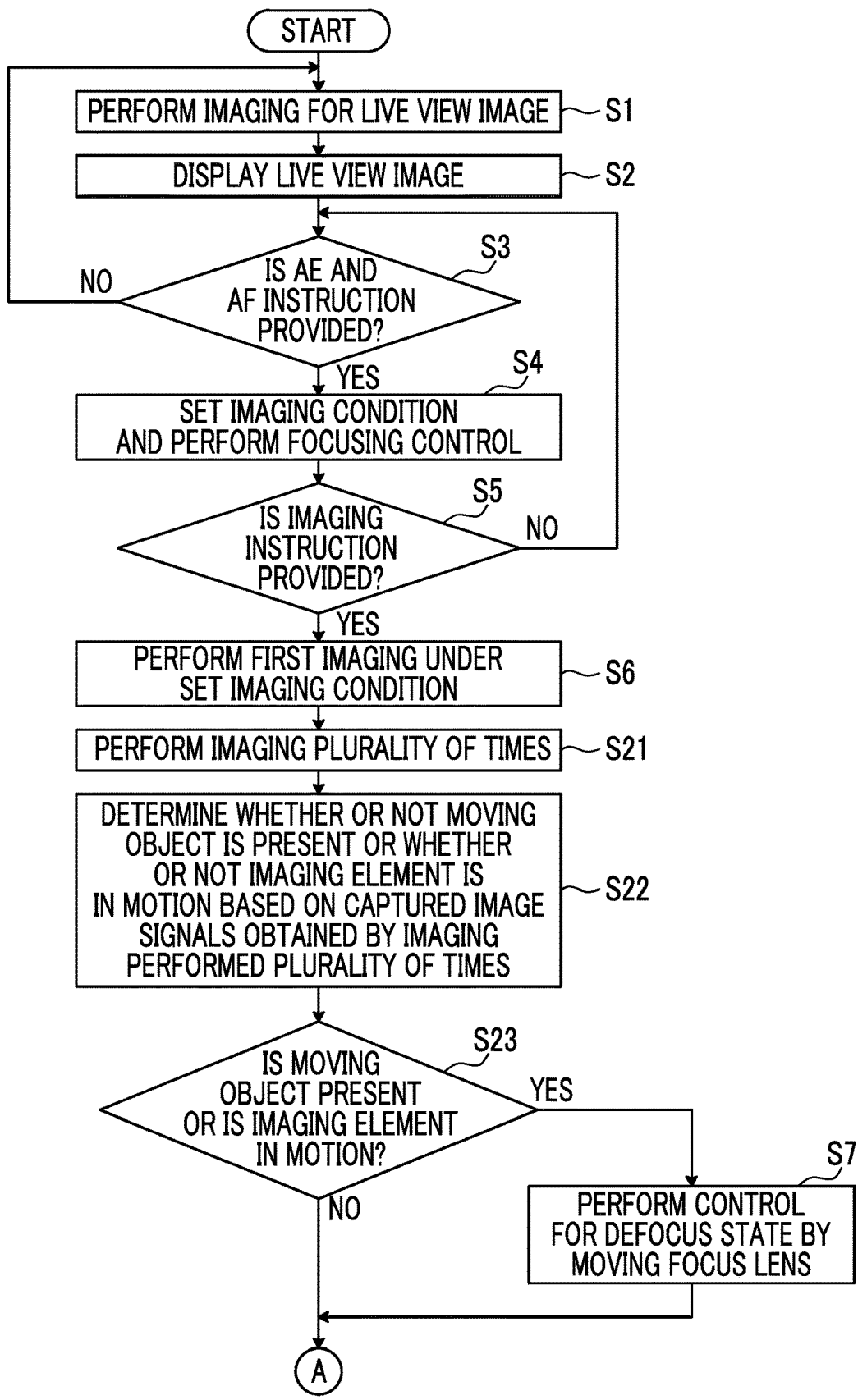
FIG. 5 is a flowchart for describing a second modification example of the operation at the time of the imaging mode of the digital camera 100 illustrated in FIG. 1.
Figure 6:
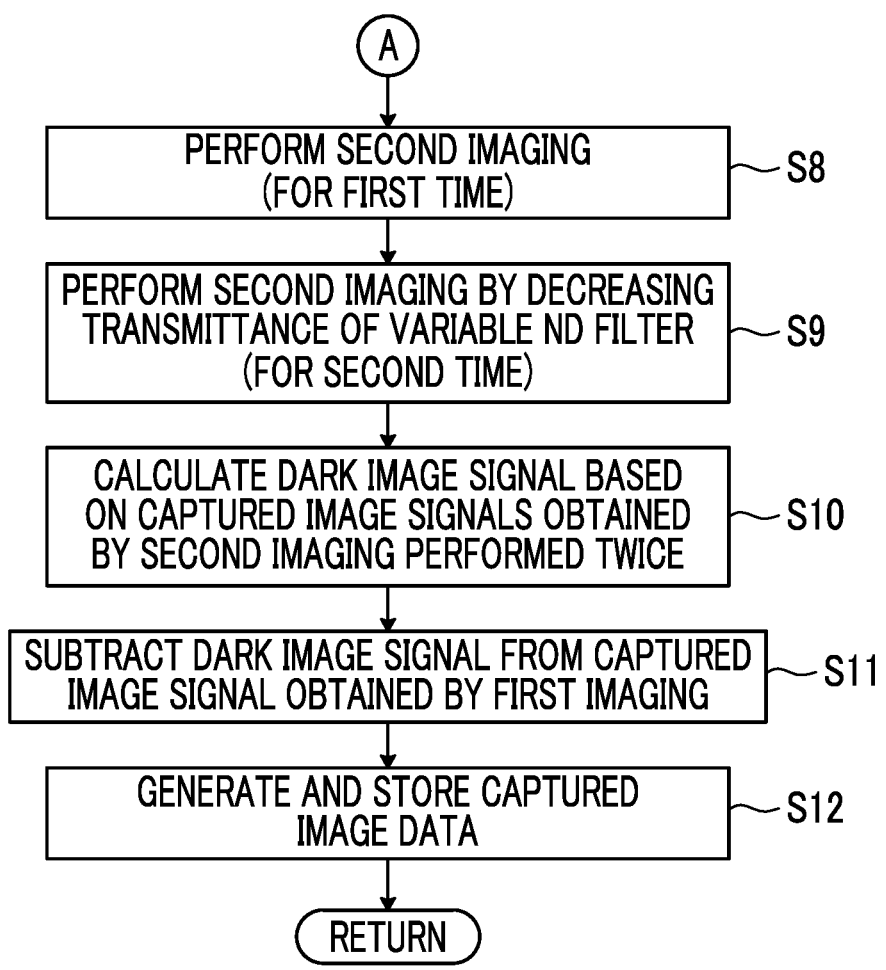
FIG. 6 is a flowchart for describing the second modification example of the operation at the time of the imaging mode of the digital camera 100 illustrated in FIG. 1.

FIG. 5 and FIG. 6 are flowcharts for describing a second modification example of the operation at the time of the imaging mode of the digital camera 100 illustrated in FIG. 1. The flowcharts illustrated in FIG. 5 and FIG. 6 are the same as FIG. 3 except for a point that step S21 to step S23 are added. In FIG. 5 and FIG. 6, the same processing as FIG. 3 is designated by the same reference signs, and descriptions of such processing will not be repeated.

After step S6, the controller 11A causes the imager 5 to perform imaging a plurality of times under the same condition (the same imaging condition and the same focal position) as the time of the first imaging (step S21).

Next, the controller 11A determines whether or not a moving object is included in the subject being imaged, or whether or not the digital camera 100 is in motion (the same meaning as whether or not the imager 5 is in motion) based on the plurality of captured image signals obtained from the imager 5 by imaging performed a plurality of times in step S21 (step S22).

In a case where it is determined that a moving object is included in the subject being imaged or the digital camera 100 is in motion (step S23: YES), the controller 11A performs processing of step S7 to step S12.

In a case where it is determined that a moving object is not included in the subject being imaged or the digital camera 100 is not moving (step S23: NO), the controller 11A performs processing of step S8 to step S12 without controlling the focus lens, that is, while maintaining the focusing state at the time of the first imaging.

According to the above second modification example, in a case where a moving object is not included in the subject being imaged or the digital camera 100 is not moving, processing of step S7 can be omitted. Thus, reduction of power consumption and an increase in speed of imaging processing can be implemented. The same effect can be obtained even by changing step S7 in FIG. 5 to step S7a in FIG. 4.

While the digital camera 100 described thus far obtains the plurality of captured image signals having different brightness by changing the transmittance of the variable ND filter 3 at the time of the second imaging performed a plurality of times, the present invention is not limited thereto. For example, it may be configured that the variable ND filter 3 is removed, and the plurality of captured image signals having different brightness may be obtained by controlling the F number of the stop 2 to different values at the time of the second imaging performed a plurality of times. In this configuration, the stop 2 constitutes the optical element of which the quantity of transmitted light is variable.

In the digital camera 100 in FIG. 1, the variable ND filter 3 and the ND drive unit 3A may be incorporated in the attachable and detachable lens device 40A, and the lens controller 4 may control the ND drive unit 3A in accordance with an instruction from the system controller 11.

Next, a configuration of a smartphone as the imaging apparatus according to the embodiment of the present invention will be described.

Figure 7:
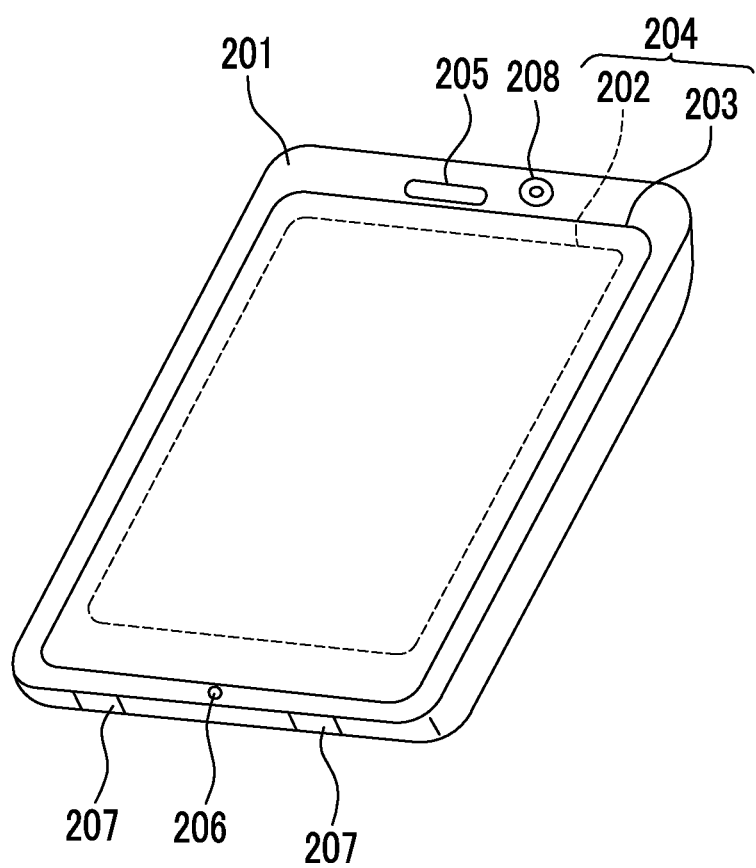
FIG. 7 illustrates an exterior of a smartphone 200 that is the imaging apparatus according to one embodiment of the present invention.

FIG. 7 illustrates an exterior of a smartphone 200 that is the imaging apparatus according to one embodiment of the present invention.

The smartphone 200 illustrated in FIG. 7 includes a casing 201 having a flat plate shape and comprises a display and input unit 204 in which a display panel 202 as a display surface and an operation panel 203 as an input unit are integrated on one surface of the casing 201.

The casing 201 comprises a speaker 205, a microphone 206, an operation unit 207, and a camera unit 208. The configuration of the casing 201 is not for limitation and may employ, for example, a configuration in which the display surface and the input unit are independently disposed, or a configuration that has a folded structure or a sliding mechanism.

Figure 8:
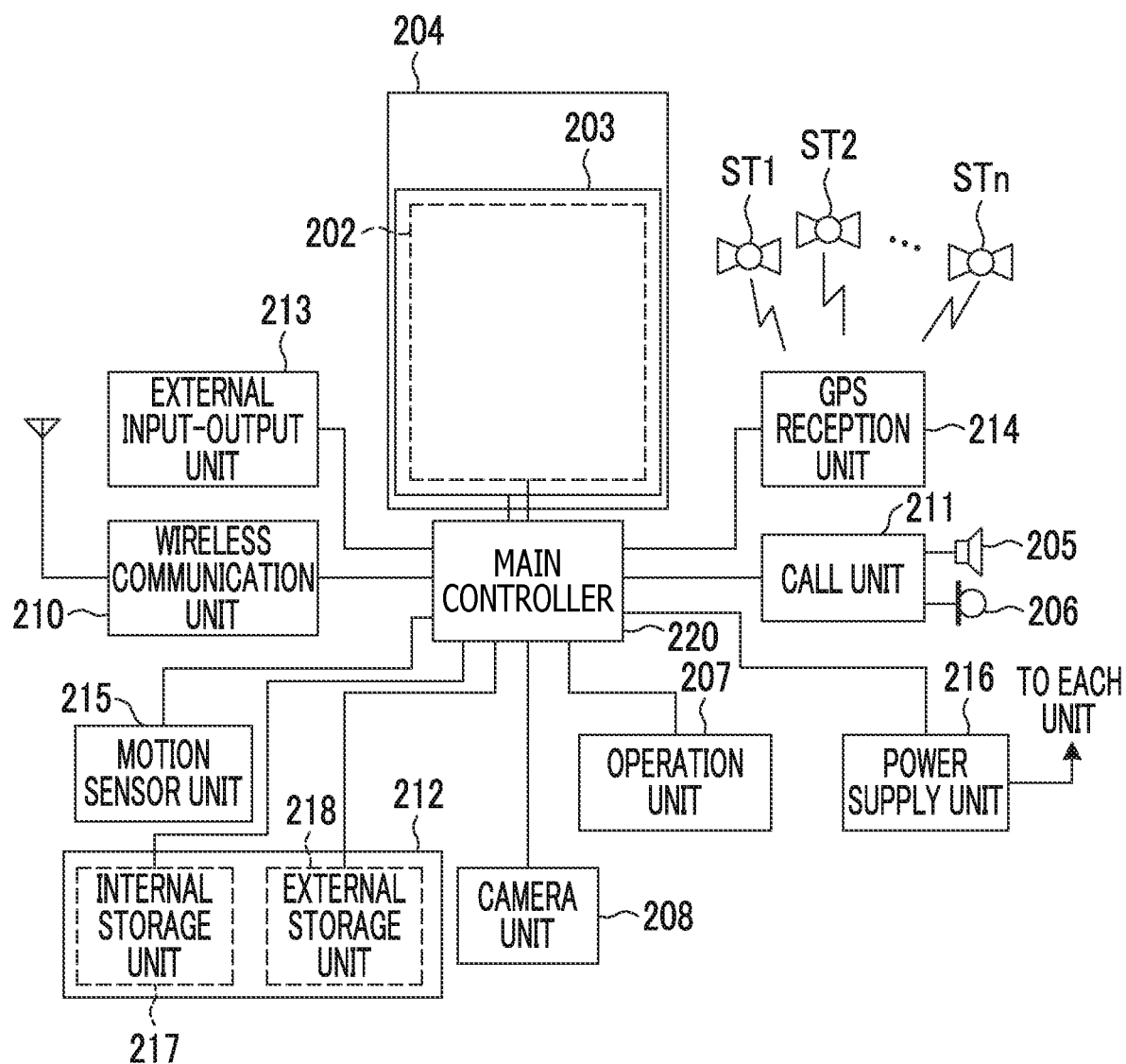
FIG. 8 is a block diagram illustrating a configuration of the smartphone 200 illustrated in FIG. 7.

FIG. 8 is a block diagram illustrating a configuration of the smartphone 200 illustrated in FIG. 7.

As illustrated in FIG. 8, a wireless communication unit 210, the display and input unit 204, a call unit 211, the operation unit 207, the camera unit 208, a storage unit 212, an external input-output unit 213, a global positioning system (GPS) reception unit 214, a motion sensor unit 215, a power supply unit 216, and a main controller 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main controller 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and detects a user operation with respect to the displayed information under control of the main controller 220. The display and input unit 204 comprises the display panel 202 and the operation panel 203.

The display panel 202 uses a liquid crystal display (LCD), an organic electro-luminescence display (OELD), or the like as a display device.

The operation panel 203 is a device that is placed such that an image displayed on the display surface of the display panel 202 can be visually recognized, is operated by a finger of the user or a stylus, and detects one or a plurality of coordinates. In a case where the device is operated by the finger of the user or the stylus, a detection signal generated by the operation is output to the main controller 220. Next, the main controller 220 detects an operation position (coordinates) on the display panel 202 based on the received detection signal.

As illustrated in FIG. 8, the display panel 202 and the operation panel 203 of the smartphone 200 illustrated as the imaging apparatus according to one embodiment of the present invention are integrated and constitute the display and input unit 204. The operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part in overlap with the display panel 202 and a detection region (hereinafter, referred to as a non-display region) for an edge part other than the overlapping part that is not in overlap with the display panel 202.

The size of the display region and the size of the display panel 202 may completely match, but both sizes do not need to match. In addition, the operation panel 203 may comprise two sensitive regions of the edge part and an inner part other than the edge part. Furthermore, the width of the edge part is appropriately designed depending on the size and the like of the casing 201.

Furthermore, as a position detection method employed in the operation panel 203, a matrix switch method, a resistive film method, a surface acoustic wave method, an infrared method, an electromagnetic induction method, an electrostatic capacitive method, and the like are exemplified, and any of the methods can be employed.

The call unit 211 comprises the speaker 205 or the microphone 206 and converts voice of the user input through the microphone 206 into voice data processable in the main controller 220 and outputs the voice data to the main controller 220, or decodes voice data received by the wireless communication unit 210 or the external input-output unit 213 and outputs the decoded voice data from the speaker 205.

In addition, as illustrated in FIG. 7, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 7, the operation unit 207 is a push-button type switch that is mounted on a side surface of the casing 201 of the smartphone 200 and enters an ON state in a case where the switch is pressed by the finger or the like, and enters an OFF state by restoring force of a spring or the like in a case where the finger is released.

The storage unit 212 stores a control program and control data of the main controller 220, application software, address data in which a name, a telephone number, or the like of a communication counterpart is associated, transmitted and received electronic mail data, web data downloaded by web browsing, and downloaded contents data, and temporarily stores streaming data or the like. In addition, the storage unit 212 is configured with an internal storage unit 217 incorporated in the smartphone and an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication or the like (for example, Universal Serial Bus (USB) or IEEE1394) or through a network (for example, the Internet, a wireless LAN, Bluetooth (registered trademark), radio frequency identification (RFID), infrared communication (Infrared Data Association (IrDA) (registered trademark)), Ultra Wideband (UWB) (registered trademark), or ZigBee (registered trademark)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GPS reception unit 214 receives GPS signals transmitted from GPS satellites ST1 to STn, executes a position measurement calculation process based on the received plurality of GPS signals, and detects a position that includes a latitude, a longitude, and an altitude of the smartphone 200 in accordance with an instruction from the main controller 220. In a case where positional information can be acquired from the wireless communication unit 210 or the external input-output unit 213 (for example, a wireless LAN), the GPS reception unit 214 can detect the position using the positional information.

The motion sensor unit 215 comprises, for example, a three-axis acceleration sensor and detects a physical motion of the smartphone 200 in accordance with an instruction from the main controller 220. By detecting the physical motion of the smartphone 200, a movement direction or an acceleration of the smartphone 200 is detected. The detection result is output to the main controller 220.

The power supply unit 216 supplies power stored in a battery (not illustrated) to each unit of the smartphone 200 in accordance with an instruction from the main controller 220.

The main controller 220 comprises a microprocessor, operates in accordance with the control program and the control data stored in the storage unit 212, and manages and controls each unit of the smartphone 200. In addition, the main controller 220 has a mobile communication control function of controlling each unit of a communication system and an application processing function for performing voice communication or data communication through the wireless communication unit 210.

The application processing function is implemented by operating the main controller 220 in accordance with the application software stored in the storage unit 212. For example, the application processing function is an infrared communication function of performing data communication with an opposing apparatus by controlling the external input-output unit 213, an electronic mail function of transmitting and receiving electronic mails, or a web browsing function of browsing a web page.

In addition, the main controller 220 has an image processing function such as displaying a video on the display and input unit 204 based on image data (data of a still image or a motion image) such as reception data or downloaded streaming data.

The image processing function refers to a function of causing the main controller 220 to decode the image data, perform image processing on the decoding result, and display an image on the display and input unit 204.

Furthermore, the main controller 220 executes display control for the display panel 202 and operation detection control for detecting the user operation through the operation unit 207 and the operation panel 203.

By executing the display control, the main controller 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main controller 220 detects the user operation through the operation unit 207, receives an operation with respect to the icon and an input of a text string in an input field of the window through the operation panel 203, or receives a request for scrolling the display image through the scroll bar.

Furthermore, by executing the operation detection control, the main controller 220 has a touch panel control function of determining whether the operation position on the operation panel 203 is in the overlapping part (display region) in overlap with the display panel 202 or the other edge part (non-display region) not in overlap with the display panel 202 and controlling the sensitive region of the operation panel 203 or a display position of the software key.

In addition, the main controller 220 can detect a gesture operation with respect to the operation panel 203 and execute a preset function depending on the detected gesture operation.

The gesture operation is not a simple touch operation in the related art and means an operation of drawing a trajectory by the finger or the like, designating a plurality of positions at the same time, or drawing a trajectory for at least one of the plurality of positions as a combination thereof.

The camera unit 208 includes configurations other than the external memory controller 20, the storage medium 21, the display unit 22, and the operation unit 14 in the digital camera 100 illustrated in FIG. 1.

A captured image generated by the camera unit 208 can be stored in the storage unit 212 or be output through the external input-output unit 213 or the wireless communication unit 210.

In the smartphone 200 illustrated in FIG. 7, the camera unit 208 is mounted on the same surface as the display and input unit 204. However, the mount position of the camera unit 208 is not for limitation purposes. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in a case where the GPS reception unit 214 detects the position, the position can be detected by referring to the image from the camera unit 208. Furthermore, by referring to the image from the camera unit 208, an optical axis direction of the camera unit 208 of the smartphone 200 can be determined, or the current usage environment can be determined without using the three-axis acceleration sensor or using the three-axis acceleration sensor. The image from the camera unit 208 can also be used in the application software.

Besides, image data of a still image or a motion image to which the positional information acquired by the GPS reception unit 214, voice information (may be text information acquired by performing voice to text conversion by the main controller or the like) acquired by the microphone 206, attitude information acquired by the motion sensor unit 215, or the like is added can be stored in the storage unit 212 or be output through the external input-output unit 213 or the wireless communication unit 210.

Even in the smartphone 200 having the above configuration, the dark image signal can be accurately obtained.

As described thus far, the following matters are disclosed in the present specification.

(1) An imaging control device comprising a controller that causes an imager which images a subject through a movable lens and an optical element of which a quantity of transmitted light is variable, to perform first imaging for recording and further perform second imaging a plurality of times for obtaining a dark image signal generated in a light-blocking state of the imager, and a dark image signal acquirer that obtains the dark image signal based on a plurality of first captured image signals obtained from the imager by the second imaging performed a plurality of times, in which the controller causes the imager to perform the second imaging in each of a plurality of exposure states where a quantity of light incident on the imager is greater than zero and is different for each state, by controlling the optical element, and the controller obtains, by controlling the movable lens at a time of the second imaging, a state where a first imaging condition value determined by a control state of the movable lens at the time of the second imaging is different from a second imaging condition value determined by a control state of the movable lens at a time of the first imaging.

(2) The imaging control device according to (1), in which the movable lens is a focus lens, and the first imaging condition value and the second imaging condition value are focal positions.

(3) The imaging control device according to (2), in which the controller obtains, by controlling the movable lens at the time of the second imaging, a state where a difference between the focal position as the first imaging condition value and the focal position as the second imaging condition value is greater than or equal to a predetermined value.

(4) The imaging control device according to (3), in which the predetermined value is a value of half of a maximum range that can be taken as a movement range of the focal position.

(5) The imaging control device according to (1), in which the movable lens is a zoom lens, and the first imaging condition value and the second imaging condition value are focal lengths.

(6) The imaging control device according to (5), in which the controller obtains a state where the focal lengths are longest by controlling the movable lens at the time of the second imaging.

(7) The imaging control device according to any one of (1) to (6), in which the controller determines, before the second imaging performed a plurality of times, whether or not a moving object is included in the subject or whether or not the imager is in motion based on a plurality of second captured image signals obtained from the imager by causing the imager to perform imaging a plurality of times, and in a case where it is determined that the moving object is not included or the imager is not in motion, controls the movable lens to a state where the second imaging condition value is obtained at the time of the second imaging.

(8) An imaging apparatus comprising the imaging control device according to any one of (1) to (7), and the imager.

(9) The imaging apparatus according to (8), further comprising the optical element.

(10) An imaging control method comprising a control step of causing an imager which images a subject through a movable lens and an optical element of which a quantity of transmitted light is variable, to perform first imaging for recording and further perform second imaging a plurality of times for obtaining a dark image signal generated in a light-blocking state of the imager, and a dark image signal acquisition step of obtaining the dark image signal based on a plurality of first captured image signals obtained from the imager by the second imaging performed a plurality of times, in which in the control step, the imager is caused to perform the second imaging in each of a plurality of exposure states where a quantity of light incident on the imager is greater than zero and is different for each state, by controlling the optical element, and in the control step, by controlling the movable lens at a time of the second imaging, a state where a first imaging condition value determined by a control state of the movable lens at the time of the second imaging is different from a second imaging condition value determined by a control state of the movable lens at a time of the first imaging is obtained.

(11) The imaging control method according to (10), in which the movable lens is a focus lens, and the first imaging condition value and the second imaging condition value are focal positions.

(12) The imaging control method according to (11), in which in the control step, by controlling the movable lens at the time of the second imaging, a state where a difference between the focal position as the first imaging condition value and the focal position as the second imaging condition value is greater than or equal to a predetermined value is obtained.

(13) The imaging control method according to (12), in which the predetermined value is a value of half of a maximum range that can be taken as a movement range of the focal position.

(14) The imaging control method according to (10), in which the movable lens is a zoom lens, and the first imaging condition value and the second imaging condition value are focal lengths.

(15) The imaging control method according to (14), in which in the control step, a state where the focal lengths are longest is obtained by controlling the movable lens at the time of the second imaging.

(16) The imaging control method according to any one of (10) to (15), in which in the control step, before the second imaging performed a plurality of times, whether or not a moving object is included in the subject or whether or not the imager is in motion is determined based on a plurality of second captured image signals obtained from the imager by causing the imager to perform imaging a plurality of times, and in a case where it is determined that the moving object is not included or the imager is not in motion, the movable lens is controlled to a state where the second imaging condition value is obtained at the time of the second imaging.

(17) An imaging control program that is a program causing a computer to execute a control step of causing an imager which images a subject through a movable lens and an optical element of which a quantity of transmitted light is variable, to perform first imaging for recording and further perform second imaging a plurality of times for obtaining a dark image signal generated in a light-blocking state of the imager, and a dark image signal acquisition step of obtaining the dark image signal based on a plurality of first captured image signals obtained from the imager by the second imaging performed a plurality of times, in which in the control step, the imager is caused to perform the second imaging in each of a plurality of exposure states where a quantity of light incident on the imager is greater than zero and is different for each state, by controlling the optical element, and in the control step, by controlling the movable lens at a time of the second imaging, a state where a first imaging condition value determined by a control state of the movable lens at the time of the second imaging is different from a second imaging condition value determined by a control state of the movable lens at a time of the first imaging is obtained.

While various embodiments are described above with reference to the drawings, the present invention is not limited to such examples. It is apparent that those skilled in the art may perceive various modification examples or correction examples within the scope disclosed in the claims, and those examples are also understood as falling in the technical scope of the present invention. Various constituents in the embodiment may be combined in any manner without departing from the gist of the invention.

The present application is based on Japanese Patent Application (JP2018-057246) filed on Mar. 23, 2018, the content of which is incorporated in the present application by reference.

According to the present invention, an imaging control device, an imaging apparatus, an imaging control method, and an imaging control program capable of accurately obtaining a dark image signal can be provided.

EXPLANATION OF REFERENCES

100: digital camera
40A: lens device
1: imaging lens
2: stop
4: lens controller
8: lens drive unit
9: stop drive unit
40B: main body unit
3: variable ND filter
3A: ND drive unit
5: imager
5A: imager drive unit
11: system controller
11A: controller
11B: dark image signal acquirer
14: operation unit
15: memory controller
16: memory
17: digital signal processing unit
20: external memory controller
21: storage medium
22: display unit
24: control bus
25: data bus
200: smartphone
201: casing
202: display panel
203: operation panel
204: display and input unit
205: speaker
206: microphone
207: operation unit
208: camera unit
210: wireless communication unit
211: call unit
212: storage unit
213: external input-output unit
214: GPS reception unit
215: motion sensor unit
216: power supply unit
217: internal storage unit
218: external storage unit
220: main controller
ST1 to STn: GPS satellite

What is claimed is:

1. An imaging control device comprising:
a controller, configured to control an imager which images a subject through a movable lens and an optical element of which a quantity of transmitted light is variable, to perform first imaging for recording and further perform second imaging a plurality of times for obtaining a dark image signal generated in a light-blocking state of the imager; and
configured to obtain the dark image signal based on a plurality of first captured image signals obtained from the imager by the second imaging performed a plurality of times,
wherein the controller is configured to control the imager to perform the second imaging in each of a plurality of exposure states where a quantity of light incident on the imager is greater than 0 and is different for each of the exposure states, by controlling the optical element, and
the controller is configured to obtain, by controlling the movable lens at a time of the second imaging, a state where a first imaging condition value determined by a control state of the movable lens at the time of the second imaging is different from a second imaging condition value determined by a control state of the movable lens at a time of the first imaging.

2. The imaging control device according to claim 1,
wherein the movable lens is a focus lens, and
the first imaging condition value and the second imaging condition value are focal positions.

3. The imaging control device according to claim 2,
wherein the controller obtains, by controlling the movable lens at the time of the second imaging, a state where a difference between the focal position as the first imaging condition value and the focal position as the second imaging condition value is greater than or equal to a predetermined value.

4. The imaging control device according to claim 3,
wherein the predetermined value is a value of half of a maximum range that can be taken as a movement range of the focal position.

5. The imaging control device according to claim 1,
wherein the movable lens is a zoom lens, and
the first imaging condition value and the second imaging condition value are focal lengths.

6. The imaging control device according to claim 5,
wherein the controller obtains a state where the focal lengths are longest by controlling the movable lens at the time of the second imaging.

7. The imaging control device according to claim 1,
wherein the controller is configured to determine, before the second imaging performed a plurality of times, whether or not a moving object is included in the subject or whether or not the imager is in motion based on a plurality of second captured image signals obtained from the imager by controlling the imager to perform imaging a plurality of times, and in a case where the controller determines that the moving object is not included in the subject or the imager is not in motion, control the movable lens to a state where the second imaging condition value is obtained at the time of the second imaging.

8. An imaging apparatus comprising:
the imaging control device according to claim 1; and
the imager.

9. The imaging apparatus according to claim 8, further comprising:
the optical element.

10. An imaging control method comprising:
a control step of controlling an imager which images a subject through a movable lens and an optical element of which a quantity of transmitted light is variable, to perform first imaging for recording and further perform second imaging a plurality of times for obtaining a dark image signal generated in a light-blocking state of the imager; and
a dark image signal acquisition step of obtaining the dark image signal based on a plurality of first captured image signals obtained from the imager by the second imaging performed a plurality of times,
wherein, in the control step, the imager is controlled to perform the second imaging in each of a plurality of exposure states where a quantity of light incident on the imager is greater than 0 and is different for each state, by controlling the optical element, and
in the control step, by controlling the movable lens at a time of the second imaging, a state where a first imaging condition value determined by a control state of the movable lens at the time of the second imaging is different from a second imaging condition value determined by a control state of the movable lens at a time of the first imaging is obtained.

11. The imaging control method according to claim 10, wherein the movable lens is a focus lens, and
the first imaging condition value and the second imaging condition value are focal positions.

12. The imaging control method according to claim 11, wherein, in the control step, by controlling the movable lens at the time of the second imaging, a state where a difference between the focal position as the first imaging condition value and the focal position as the second imaging condition value is greater than or equal to a predetermined value is obtained.

13. The imaging control method according to claim 12, wherein the predetermined value is a value of half of a maximum range that can be taken as a movement range of the focal position.

14. The imaging control method according to claim 10, wherein the movable lens is a zoom lens, and
the first imaging condition value and the second imaging condition value are focal lengths.

15. The imaging control method according to claim 14, wherein in the control step, a state where the focal lengths are longest is obtained by controlling the movable lens at the time of the second imaging.

16. The imaging control method according to claim 10, wherein in the control step, before the second imaging performed a plurality of times, whether or not a moving object is included in the subject or whether or not the imager is in motion is determined based on a plurality of second captured image signals obtained from the imager by controlling the imager to perform imaging a plurality of times, and in a case where it is determined that the moving object is not included or the imager is not in motion, the movable lens is controlled to a state where the second imaging condition value is obtained at the time of the second imaging.

17. A non-transitory storage medium storing an imaging control program that is a program causing a computer to execute:
a control step of controlling an imager which images a subject through a movable lens and an optical element of which a quantity of transmitted light is variable, to perform first imaging for recording and further perform second imaging a plurality of times for obtaining a dark image signal generated in a light-blocking state of the imager; and
a dark image signal acquisition step of obtaining the dark image signal based on a plurality of first captured image signals obtained from the imager by the second imaging performed a plurality of times,
wherein, in the control step, the imager is controlled to perform the second imaging in each of a plurality of exposure states where a quantity of light incident on the imager is greater than 0 and is different for each state, by controlling the optical element, and
in the control step, by controlling the movable lens at a time of the second imaging, a state where a first imaging condition value determined by a control state of the movable lens at the time of the second imaging is different from a second imaging condition value determined by a control state of the movable lens at a time of the first imaging is obtained.

* * * * *